No. 700,583. Patented May 20, 1902.
T. F. VAN LUVEN.
AXLE BEARING.
(Application filed Aug. 21, 1901.)
(No Model.)
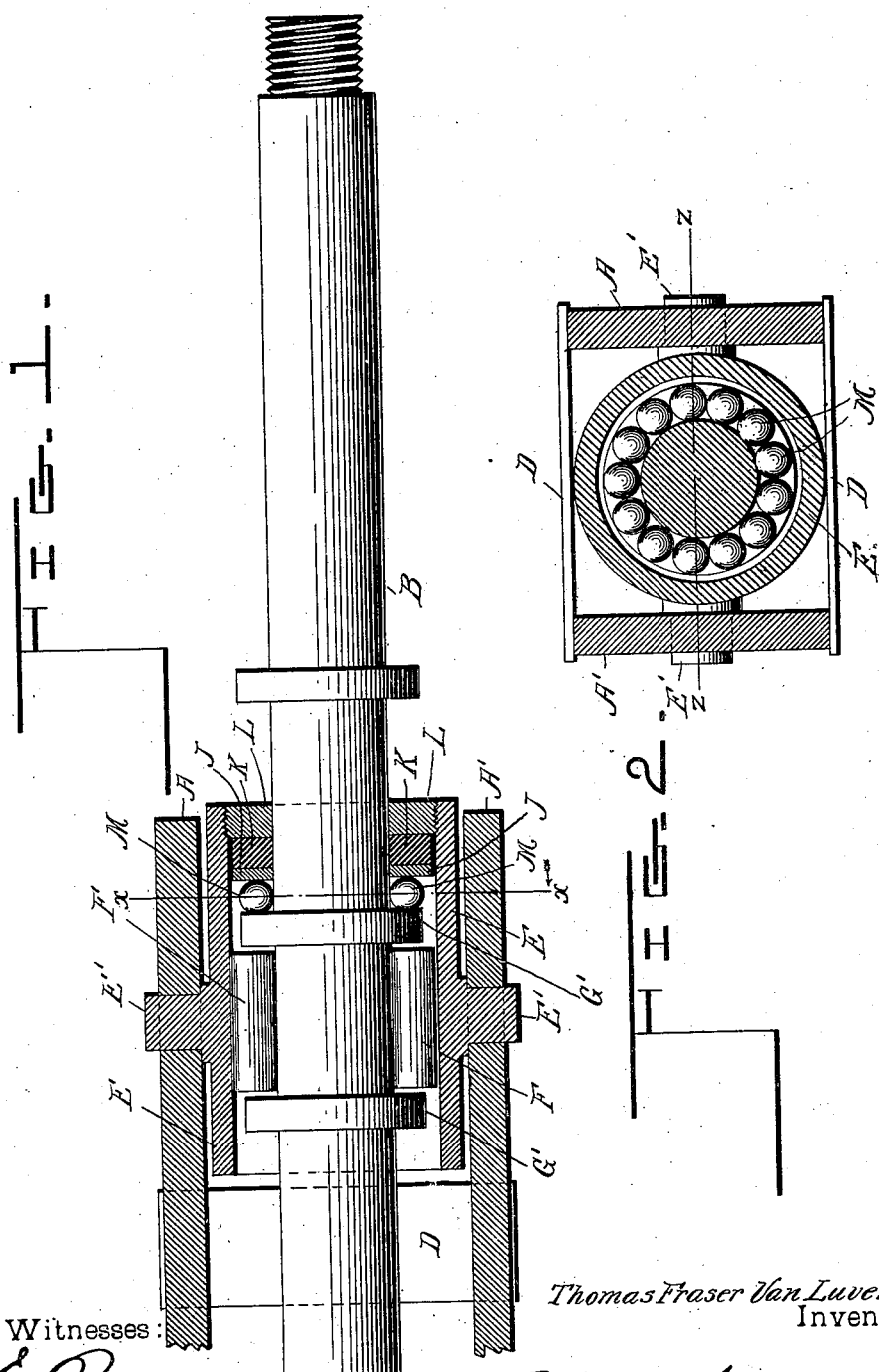
Witnesses:
Ed. Page
T. Maynard
Thomas Fraser Van Luven
Inventor,
By Marion & Marion
Attorneys

UNITED STATES PATENT OFFICE.

THOMAS FRASER VAN LUVEN, OF CATARAQUI, CANADA, ASSIGNOR OF ONE-HALF TO THOMAS SHARPE BURLEY, OF NAPANEE, CANADA.

AXLE-BEARING.

SPECIFICATION forming part of Letters Patent No. 700,583, dated May 20, 1902.

Application filed August 21, 1901. Serial No. 72,768. (No model.)

*To all whom it may concern:*

Be it known that I, THOMAS FRASER VAN LUVEN, a subject of His Majesty the King of Great Britain, residing at Cataraqui, in the county of Frontenac, Province of Ontario, Canada, have invented certain new and useful Improvements in Axle-Bearings; and I do hereby declare that the following is a full, clear, and exact description of the invention, such as will enable others skilled in the art to which it appertains to make and use the same, reference being had to the accompanying drawings, in which—

Figure 1 is a longitudinal horizontal section of my axle and axle box or bearing on line Z Z, Fig. 2; and Fig. 2 is a cross-section on line *x x*, Fig. 1.

My invention relates to axle-boxes having roller-bearings, the object of the invention being to provide an improved combination cylinder and ball-bearing, which besides supporting the axle-box provides for end thrust thereof in a yieldable manner and in addition prevents the binding or seizing of the axle upon the box due to the parts being out of line, as is necessarily true to a greater or less extent in ordinary axles.

To this end my invention consists in an axle-box containing means for allowing the axle to rotate antifrictionally therein and at the same time provides a yielding antifriction-bearing to take up the end thrust without jar or blow.

My invention is applicable to all kinds of vehicles, including not simply ordinary road wagons and carriages, but especially street and steam railway cars, hand-cars, and, in short, to any wheeled vehicle.

The supporting-pedestal of the vehicle body or truck is provided with a pair of parallel cheek-plates A A', it being understood that one of these pedestals is provided at each side of the vehicle to support the corresponding end of the axle, and a pair of coaxial apertures are formed in the cheek-plates to support the trunnions E' of the box E, the cheek-plates A A' being maintained in their proper relation by brace-plates D at their top and bottom edges. The object of providing the pivot for the axle-box E is in order to enable the axle B to be squarely seated therein and to bear upon the full bearing-surfaces located therein, to be presently described, it being understood that were the axle-box rigidly fixed in the pedestal or simply allowed to slide longitudinally therein, as is the case in ordinary street-car trucks, the box E would necessarily be confined in a position forming a slight angle relative to the axle instead of being strictly coaxial therewith, because each pedestal is attached separately to the vehicle body or truck and it is practically impossible to secure them so that they will be strictly in line or coaxial with each other, and, furthermore, in the case of light wagon-bodies the intermediate supporting means between the two axle-boxes or pedestals would be caused to spring more or less by the motion of the vehicle, and therefore the pedestals will naturally be turned more or less about the trunnions E' as an axis, corresponding to the springing of the vehicle, and would likewise cause a binding of the axle-bearings were said trunnions not provided. The axle B runs through the axle-box E and turns or rotates with the wheels of the vehicle, and said axle has collars G G' within said box. F represents antifriction-rollers located between said collars and rotating against the inner circumference of the axle-box, and upon them the axle B, and the rollers carry the weight of the load. The axle-box thus mounted will tilt on the trunnions, thereby adjusting itself to whatever inclination the axle may assume in following the high and low side of the roadway, so that the rollers will be always parallel to the axle, and hence run true and parallel to one another and not pinch or become deranged, and the rollers by running true with the axle will reduce the friction to a minimum and cause the vehicle to be easily drawn when traveling.

J is a washer sleeved on the axle at a sufficient distance from the outside collar G' to allow balls M to fit in, thus forming a raceway for the balls to run in, and said balls receive the end thrust of the axle to avert undue friction.

K is a rubber or other washer sleeved on the axle to exclude dust from the axle-bearings, and said washer is kept in place by an annular disk L, sleeved on the axle the periphery threaded and screwing into the outer end of the cylindrical axle-box to keep said washer in place and to exclude dirt.

Having thus described my invention, what I claim as new is—

1. The combination of a rotary axle having two collars G, G' thereon, an axle-box E having trunnions E' at right angles to said axle, a series of rollers F surrounding said axle between the collars thereof and rolling upon the interior surface of said axle-box, a series of balls M surrounding the axle exterior to one of said collars, a metallic washer J on the other side of the balls closing the raceway thereof and forming a thrust-bearing for said shaft, a thick resilient washer K surrounding the axle outside of the washer J and forming both a dust-excluding means and a resilient support for said washer J, an annular disk L screwed into the outer end of said axle-box to clamp said washers in place, and a pedestal having a pair of cheek-plates A, A' in which said trunnions are mounted.

2. An axle-bearing comprising a rotary axle having a journal, a pair of collars spaced apart upon and carried by said journal, an axle-box having a cylindrical inner face surrounding said journal, a series of cylindrical rollers forming bearings between said journal and said axle-box and confined by said collars, a series of balls surrounding said journal exterior to one of said collars, a metallic annular disk on the opposite side of said balls closing the raceway therefor, a resilient packing outside of said disk, and means for confining said resilient packing in said axle-box, whereby said packing forms simultaneously a dust-excluding means around said journal and a springing support for said bearing-disk.

3. An axle-bearing comprising a rotary axle having a journal, a pair of collars spaced apart upon and carried by said journal, an axle-box having a cylindrical inner face surrounding said journal, a series of cylindrical rollers forming bearings between said journal and said axle-box and confined by said collars, a series of balls surrounding said journal exterior to one of said collars, a metallic annular disk on the opposite side of said balls closing the raceway therefor, a resilient packing outside of said disk, and an annular disk screw-threaded into the outer open end of said bearing-box, whereby to retain said bearing-disk and resilient packing in place, substantially as described.

In witness whereof I have hereunto set my hand in the presence of two witnesses.

THOMAS FRASER VAN LUVEN.

Witnesses:
JOHN L. WHITING,
WILLIAM WHITE.